May 23, 1961 J. L. ATWOOD ET AL 2,985,409

GUST ALLEVIATION SYSTEM

Filed Sept. 26, 1955 7 Sheets-Sheet 1

INVENTORS
JOHN L. ATWOOD
ROBERT H. CANNON, JR.
JOHN M. JOHNSON, JR.
GUSTAV M. ANDREW
BY William R. Lane
ATTORNEY INVENTORS
JOHN L. ATWOOD
ROBERT H. CANNON, JR.
JOHN M. JOHNSON, JR.
GUSTAV M. ANDREW
BY William R. Lane
ATTORNEY INVENTORS
JOHN L. ATWOOD
ROBERT H. CANNON, JR.
JOHN M. JOHNSON, JR.
GUSTAV M. ANDREW
BY William P. Lane
ATTORNEY INVENTORS
JOHN L. ATWOOD
ROBERT H. CANNON, JR
JOHN M. JOHNSON, JR
GUSTAV M. ANDREW
BY
William P. Lane
ATTORNEY May 23, 1961 J. L. ATWOOD ET AL 2,985,409

GUST ALLEVIATION SYSTEM

Filed Sept. 26, 1955 7 Sheets-Sheet 5

INVENTORS
JOHN L. ATWOOD
ROBERT H. CANNON, JR.
JOHN M. JOHNSON, JR.
GUSTAV M. ANDREW
BY William R. Lane
ATTORNEY INVENTORS
JOHN L. ATWOOD
ROBERT H. CANNON, JR.
JOHN M. JOHNSON, JR.
GUSTAV M. ANDREW
BY William R. Lane
ATTORNEY INVENTORS
JOHN L. ATWOOD
ROBERT H. CANNON, JR.
JOHN M. JOHNSON, JR.
GUSTAV M. ANDREW
BY William R. Lane
ATTORNEY United States Patent Office 2,985,409 Patented May 23, 1961

2,985,409

GUST ALLEVIATION SYSTEM

John L. Atwood, Los Angeles, Robert H. Cannon, Jr., Whittier, and John M. Johnson, Jr., and Gustav M. Andrew, Long Beach, Calif., assignors to North American Aviation, Inc.

Filed Sept. 26, 1955, Ser. No. 536,562

7 Claims. (Cl. 244—77)

The invention relates to elimination of random translations and rotations of an airplane due to the gusty atmosphere.

The air masses, which we call the atmosphere, are never static but are subject to all kinds of turbulent motions. Masses of air are rising and falling, moving sidewards and rotating about different instantaneous axes. These random motions are similar to the motions observed on the surface of the sea, where the waves are formed.

As the airplane moves through rough air, the parameters determining the aerodynamic forces and moments, due to the local angles of attack and local angles of yaw are constantly changing their values. As a result, the aerodynamic forces and moments of the different components of the airplane fluctuate about their mean steady state values. The frequencies and the amplitudes of these random motions can be examined by statistical methods.

To illustrate the above-described motion, visualize the most simple case of an airplane flying horizontally with uniform velocity with respect to the undisturbed atmosphere. For such a steady state condition, the weight of the airplane is balanced by its lift, and the drag is balanced by the thrust. At the same time, the moments acting on an airplane, which is trimmed in pitch about a steady state angle of attack, are also balanced; the aerodynamic moments in pitch are mainly contributed by the wings and horizontal tail.

Next, visualize a discrete gust, e.g., an up-draft. The vector of the up-draft velocity combined with the vector of the forward speed, puts the resultant velocity vector at a larger angle of attack. The change in angle of attack of the wing disturbs the equilibrium because the lift of the wing is now larger than the weight of the airplane, and the contribution of the wing pitching moment is now also larger than it was before the disturbance. Thus, the airplane will have the tendency to move up, and at the same time, to pitch its nose up.

A moment later the horizontal tail will enter the gust. A similar change in angle of attack, as described above, will now occur. This will change the lift of the tail which tends to move the airplane slightly upward. It also creates a moment causing the airplane to pitch its nose down.

Any time the airplane departs from steady state conditions, either moving up or down, pitching its nose up or down, the passenger will feel accelerations connected with these movements. These feelings are similar to those felt from accelerations in a car where the brakes are suddenly applied, or in a car entering a sharp, winding road.

To cancel or diminish the unpleasant effects on the passengers caused by these accelerations, it is necessary to cancel the accelerations caused by the gust with other forces. Thus, it is necessary to cancel the disturbing forces on the wing and tail, which were generated by the gust, by means of some special control surfaces attached to the wing and to the horizontal tail, which special control surfaces have to be deflected by a proper amount at the proper time.

It has been shown that the gust first reaches the wing, and after some time interval, it arrives at the tail. Obviously this time interval depends upon the distance between the leading edge of the tail and the leading edge of the wing and upon the velocity of the airplane with respect to the air. This time interval changes because the velocity of the airplane changes for different flight conditions, (e.g. climb, horizontal flight at different altitudes, power setting, etc.). Not only does the amount of the aerodynamic forces created by the special control surfaces, attached to the wing or tail, have to be of the proper magnitude but their time of application has to be properly selected.

Consequently, sensing elements of the autopilot are needed which send a signal to the autopilot computer. The autopilot computer determines deflections of the control surfaces that are needed in order to cancel at every instant the additional aerodynamic forces and additional aerodynamic moments (thus, to cancel the accelerations) created by the gust. Then a command signal goes to the proper autopilot servo-actuator which in turn deflects the above-mentioned control surface. It is obvious that the sensing of the disturbance, computation of the remedy and the deflection of the control surface have to be done rapidly; in other words, the autopilot must have a fast response.

In the past, systems have been proposed wherein the gust was detected at some known distance forward of the wing and tail by a sensing element. Such elements detected changes of pressure or the change of the direction of the relative wind. Then a signal is sent to the computer of the autopilot, and, next, the servo of the autopilot deflects the control surface attached to the wing or to the tail. For example, when the gust represents a down draft, the lift on the wing should have been increased at the exact instant that the gust was to have encountered the wing. The amount of the lift increment should be such as to alleviate the change in lift due to the gust. But the control surface deflection which alleviates the lift force introduces at the same time, an unbalance of the aerodynamic moments acting on the airplane. Thus, a simultaneous deflection of the control surface on the tail also has to be made in order to alleviate the unbalance of moments. An instant later the gust will encounter the tail and, again, there will be an unbalance in the forces and moments acting on the airplane which will also require a similar corrective action, as described above.

The mentioned system, however, ignores the fact that the gust can have components normal to the plane of symmetry of the airplane, and that the gust can be unsymmetrical with respect to this plane. Furthermore, for each flight condition, (e.g., climb, descent, horizontal flight at different altitudes, different power settings, different angles of attack, and different velocities), it is difficult for the system to compensate for these secondary changes. Other effects not mentioned above in the simplified description of the system, include the effect of the downwash acting on the tail, the blanketing effect which diminishes the dynamic pressure on the tail, the time needed by the gust to travel from the sensing element to the wing or to the tail, and many others. Also, aero-elastic deflections of the wing, tail and fuselage represent important secondary effects which are not compensated for in the above-described system. Therefore, in a system in which we call for a correction in advance of the actual gust, it is possible that the alleviation will be incomplete, because of the many important secondary effects that were neglected. Such a system was recommended several years ago, when the art of servomechanisms was not as well developed as it is today, so that there were not available autopilots with very fast servos. The sensing of the gust in advance, gave the autopilot servo more time for action, at the expense of precision. However, the inaccurate alleviation introduces additional transients of relative motions of the airplane with respect to the atmosphere. These transients could be considered a production of additional or secondary gusts by the airplane itself, in the course of correcting natural or primary gust disturbances. In any case, it is apparent to those skilled in the art of servomechanisms that while an aerodynamic sensing system for gust alleviation, wherein the aerodynamic sensing system for gust alleviation is placed ahead of the wing or tail, possesses the advantage of detecting a gust before the airplane reacts to the gust, the gusts are only detected by the relative movement of the sensing devices and the atmosphere.

In case any secondary artificially produced gusts exist, (due to imperfect alleviation of a primary gust), they can only be corrected after they have passed, and only an extremely loose servo loop is available for their alleviation. Since this servo loop is imperfectly closed, such a system functions satisfactorily only with an inherently aerodynamically stable aircraft.

The present invention represents a system which does not have the imperfections of the previous system. It is usable equally with aerodynamically stable and unstable aircraft. It contemplates use of a plurality of null servos of extremely fast response. The actual response of the airplane to a gust is detected, not in advance, but at the moment that it actually occurs. The servo control system is fast enough to get this information, and to command the corrective action, in order to supply counteracting forces with sufficient speed and accuracy to substantially eliminate the effects of the gust upon the passengers in the airplane.

This invention contemplates a gust alleviation system in which the actual linear and angular accelerations of the airplane are detected and driven to zero. This invention further contemplates means for detecting pitch rate of the airplane and its reduction to zero. In addition, this invention contemplates controlling the lift on the wing and tail by means of a control surface attached thereto and operable independently of the pilot or autopilot.

To sense linear acceleration in the plane of symmetry, a pair of linear accelerometers is provided, one located forward, and one aft, of the C.G. Signals from these accelerometers are also combined to sense pitching accelerations about the Y axis. To sense pitch rate of the airplane, a rate gyroscope is provided. Since these instruments are carried on the airplane, they provide a dependable measure of the actual accelerations in the airplane. Consequently, a tight servo loop with a high speed of response may be utilized. The secondary effects (aero-elastic deflections of the wing, tail, body, effects of downwash, tail blanketing, Mach number, etc.) are eliminated because their effect is included in the actual measurements as determined by the detecting instruments.

It is therefore the object of this invention to provide an improved gust alleviation system.

It is another object of this invention to provide a gust alleviation system which can be used at various speeds and altitudes.

It is another object of this invention to provide a gust alleviation system in which the effect of the changes of the lift and moments due to the wing which entered the gust are compensated for by deflecting the control surface on the wing and by deflecting the control surfaces on the tail.

It is another object of this invention to provide an airplane control system in which the control surfaces such as ailerons, flaps, elevators and rudder are operated in the usual manner by a pilot or autopilot and in which accelerometers detect the effect of gusts and operate separate control surfaces appended to or forming a part of the control surfaces.

Other objects of invention will become apparent from the following description taken in connection with the accompanying drawings, in which Fig. 1 is a general layout drawing of the invention in relation to the aircraft;

Figure 13:
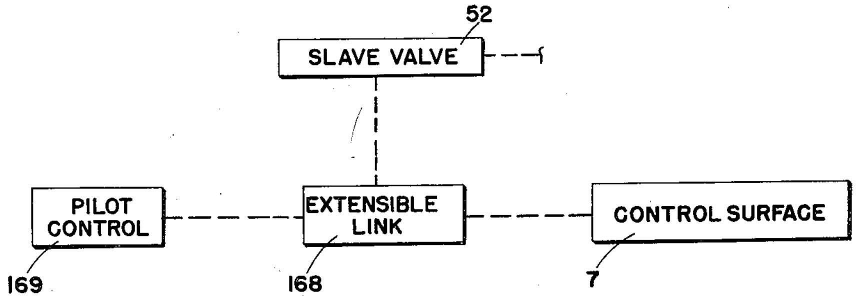

And Fig. 13 is a block diagram showing a second alternative scheme for tie-in of the gust alleviation system of this invention with the conventional pilot's control system.

Figure 1:
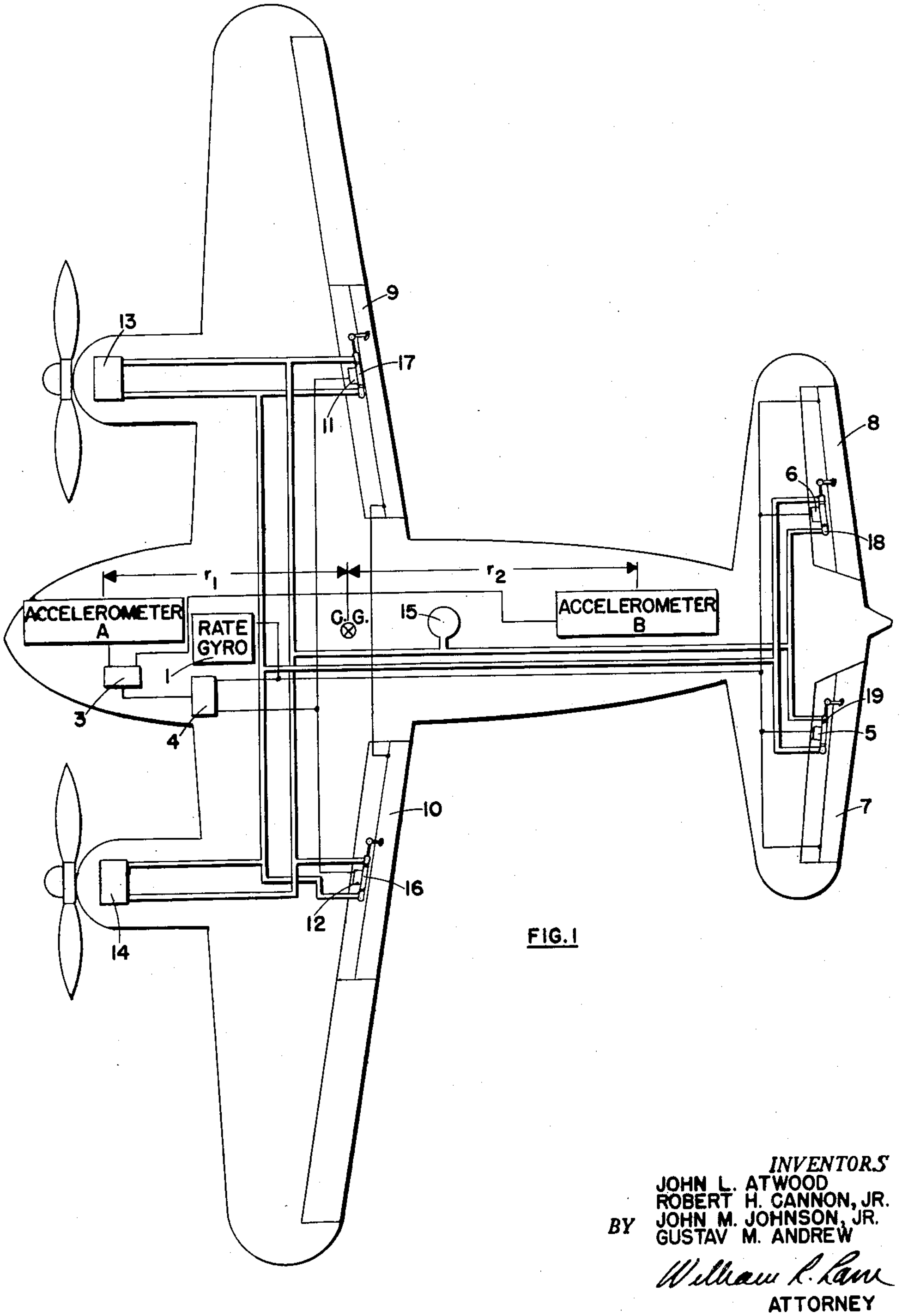

Referring now to the drawings, and in particular to Fig. 1, the general layout of the invention within the airplane is presented. In describing the invention, reference axes conforming to the standards of the National Advisory Council for Aeronautics will be used. In this system, the airplane is prepresented by a set of three mutually perpendicular axes having their origin at the C.G., or center of gravity, of the plane. This is a right hand system, with the positive X axis looking forward out the nose of the airplane, and the positive Z axis looking downward, both in the longitudinal plane of symmetry, which thus passes through the X and Z axes. The Y axis is positive in the direction of the right wing, and is also referred to herein as the "transverse" axis, about which pitch is measured. The angular movements about each of these axes are taken as positive in the clockwise direction, looking outwardly along each from the C.G. Accelerometers A and B are located distance $r_1$ and $r_2$ fore and aft the center of gravity of the airplane, as depicted. Thus accelerometer A directly measures positive or negative accelerations occuring in the plane of symmetry at a distane $r_1$ forward of the C.G. Similarly, accelerometer B measures directly accelerations at a distance $r_2$ behind the C.G. It will be readily apparent that the algebraic sum of the readings of accelerometers A and B is a measure of the acceleration of the C.G. in the plane of symmetry of the airplane, and that those readings are related to the rotational accelerations about the Y, or pitch axis. A third common type of motion of the plane, yaw, is defined as a rotation about the Z axis, and effects a change in heading of the craft relative to its ground course. Rate gyro 1 is located in the central portion of the airplane and is physically connected to the airplane to measure pitch rate of the aircraft. The outputs of the accelerometers and rate gyro 1 are fed through electronic networks 3 and 4 to control elevator servos 5 and 6 which in turn control the actuation of elevator alleviation surfaces 7 and 8 which are auxiliary control surfaces appended to the elevators of the airplane. These auxiliary control surfaces may extend for part or all of the length of the sustaining surface to which they are attached. In a similar manner, outputs of the accelerometers are taken to control flap alleviation surfaces 9 and 10 through servos 11 and 12, to be more fully described hereinafter. The flap alleviation surfaces are appended to and form a part of the landing flaps of the airplane which are generally located inboard of the ailerons of the airplane. They may, however, equally effectively be made a part of the ailerons on airplanes with or without flaps. The servo systems for applying forces to the alleviation control surfaces are hydraulic; hence, hydraulic pumps 13 and 14 driven by the aircraft engines are required and are connected to accumulator 15 by hydraulic lines as shown. Accumulator 15 is connected to hydraulic actuators 16, 17, 18, and 19 which apply forces directly to the alleviation control surfaces. The term, alleviation surfaces, is used throughout this specification to denote that portion of the flap, aileron, or elevator control surface which is used to correct the lift and attitude of the aircraft to compensate for gusts.

Figure 3:
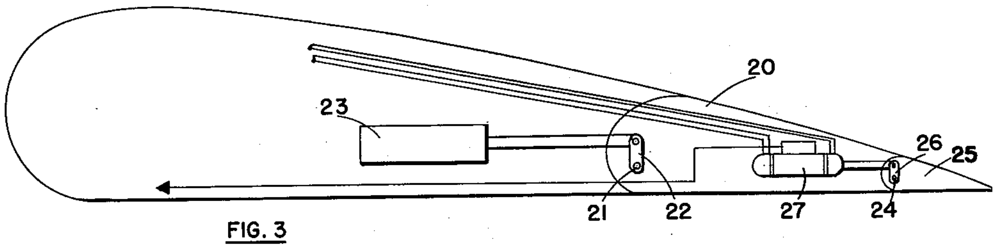
Fig. 3 is a drawing of the special control surface utilized either in connection with the flap or the elevator in this invention.

A typical arrangement of the alleviation surface either in connection with the flap or elevator is shown in Fig. 3. The usual manual or autopilot control of the landing flaps and elevators is left undisturbed by addition of the elements of this invention. Accordingly, elevator 20 pivots about pivot 21 and is actuated by bell crank 22 and hydraulic actuator 23 in the usual manner by connection to the pilot's wheel or control stick. Attached to the after portion of elevator 20 on pivot 24 is alleviation surface 25 which is free to rotate about the pivot. Actuation of this surface is accomplished by the use of bell crank 26 and hydraulic actuator 27 controlled in a manner to be hereinafter described. Actuator 27, of course, is mounted wholly within elevator 20.

Figure 2:
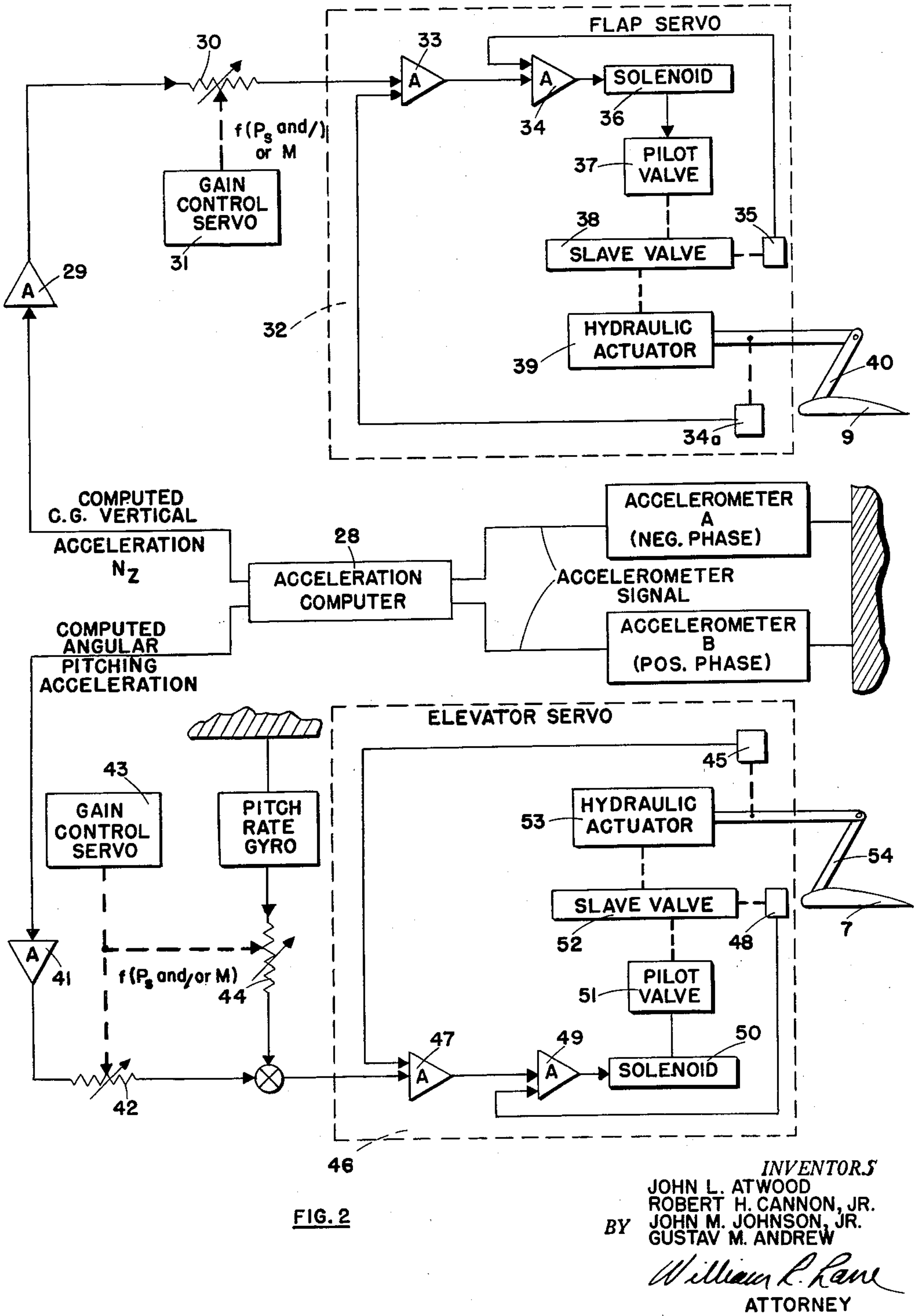
Fig. 2 is a schematic block diagram of the invention.

Referring now to Fig. 2, a generalized schematic of the entire invention is presented. Accelerometers A and B, physically mounted within the aircraft as shown in Fig. 1, have as their outputs, signals proportional to the acceleration to which these instruments are subjected. These signals are fed to an acceleration computer 28. This computer computes, in a manner to be hereinafter described, the "vertical acceleration" of the center of gravity of the airplane and the angular pitching acceleration of the airplane. The "vertical acceleration" herein is understood to mean acceleration normal to the longitudinal and transverse axes of the airplane whether the airplane is in straight and level flight or not. The computed vertical acceleration of the center of gravity is communicated in terms of an electrical signal to amplifier 29 and thence to gain control 30 mechanically connected to gain control servo 31. The output of the gain control is fed to flap servo 32 which mechanically controls the operation of the flap alleviation surface. The output of the variable gain control 30 is a signal defining the desired flap position to eliminate the vertical acceleration response for the acceleration signal. This signal is fed to amplifier 33 which also receives an input from surface position pickoff 34*a* connected to detect the displacement of the flap alleviation surface from a neutral position. The combined signal is fed from amplifier 33 to valve amplifier 34 with a signal derived from valve position pickoff 35, as shown. The output of valve amplifier 34 actuates solenoid 36 mechanically connected to pilot valve 37 which in turn hydraulically causes the movement of slave valve 38. Movement of slave valve 38, of course, causes an output of valve position pickoff 35 which is fed to the input of valve amplifier 34. Movement of slave valve 38 causes flow of hydraulic fluid to hydraulic actuator 39 connected to actuate the flap alleviation surface by means of linkage 40, or any conventional means, so that flap alleviation surface 9 or 10 is moved in the direction or sense required to increase or decrease lift of the wing of the airplane in the amount required to eliminate the acceleration sensed by accelerometers A and B. Action of the flap alleviation surfaces is restricted to affecting the lift force upon the wing by an amount necessary to eliminate the vertical acceleration of the aircraft, and does not take into account the pitching acceleration of the aircraft, if any.

As another output of acceleration computer 28, a signal proportional to the angular pitching acceleration of the airplane is fed to amplifier 41 and thence to gain control 42 which is mechanically connected to gain control servo 43. This gain control servo also controls gain control 44 whose input comes from pitch rate gyro 1 attached to the airplane as shown in Fig. 1. The outputs of gain controls 42 and 44 are combined and, as combined, represent a desired elevator position. Thus, it is seen that the control of the elevator alleviation surface is restricted to that required to eliminate the pitching acceleration and pitching rate of the airplane. The signal corresponding to the desired elevator alleviation surface deflection is combined with a signal from elevator alleviation surface pickoff 45 and elevator servo 46, and fed to amplifier 47. The output of amplifier 47 is mixed with a signal from valve position pickoff 48, and the resultant signal is fed to valve amplifier 49 which in turn controls solenoid 50 connected mechanically to pilot valve 51. Pilot valve 51 controls hydraulically the position of slave valve 52 which in turn controls the flow of hydraulic fluid to hydraulic actuator 53 which actuates elevator alleviation surface 7 or 8 by means of linkage 54, or any other convenient actuation system.

Figure 7:
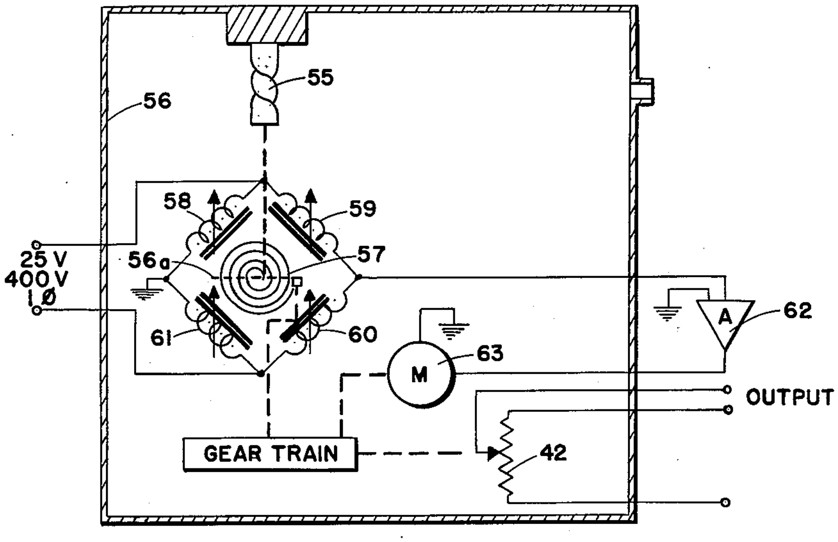
Fig. 7 is a schematic of the static pressure servo and gain control of this invention.
Figure 9:
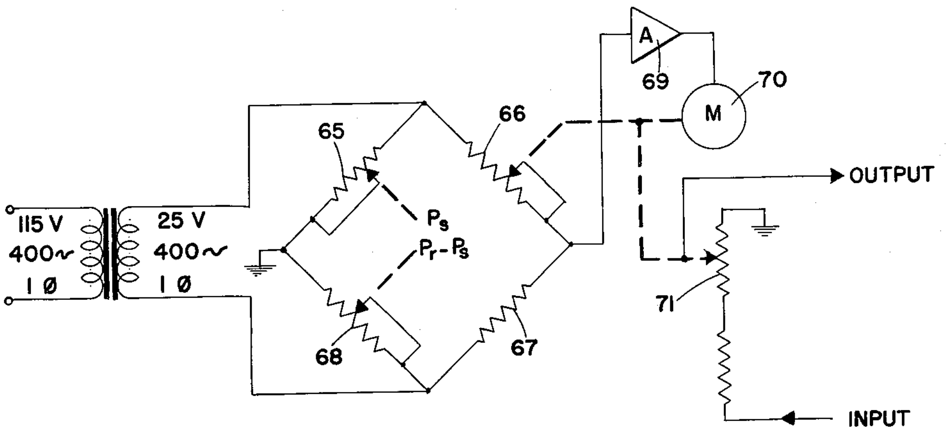
Fig. 9 is a circuit diagram of the Mach number servo and gain control of this invention.

Gain control servos 31 and 43 are shown typically in in detail in Figs. 7 and 9. In the event the system is utilized in an aircraft whose altitude may vary widely but whose speed variation is negligible, or does not approach Mach 1, as would be the case with passenger aircraft flying at speeds around 350 miles per hour, the arrangement shown in Fig. 7 is utilized to afford a control of the sensitivity of the control system to compensate for variation in the altitude of the aircraft. It is well known that at speeds below the speed of sound, the responsiveness of the aircraft to movements of the controls varies with altitude. In other words, at low altitude, the aircraft attitudes tend to be quite sensitive to deflections of the control surfaces. At higher altitudes, however, an aircraft tends to be more sluggish and responds more slowly to deflections of the aircraft control surfaces. Accordingly, at higher altitudes, to achieve the same maneuverability, or the same response, control surfaces must be deflected more rapidly and farther than at a lower altitude. Accordingly, in the device shown in Fig. 7, a Bourdon tube 55 is contained within a closed chamber 56 to which is admitted static pressure from the atmosphere outside the aircraft. The inside of the Bourdon tube is evacuated so that changes in the static pressure cause deflection of the Bourdon tube. Angular deflection of the Bourdon tube is transmitted to iron vane 56*a* which is spring-restrained by spring 57. The ends of iron vane 56*a* are mounted adjacent iron core inductances 58, 59, 60, and 61 so that angular motion of the vanes causes an unbalance of the inductances when they are connected in bridge fashion as shown in Fig. 7. The output of the bridge is fed to amplifier 62 and represents the variation in atmospheric pressure from some fixed value established when the Bourdon tube was undeflected and the bridge was balanced. This signal energizes motor 63 which is connected to drive gear train 64 which in turn rotates spring 57 in the sense necessary to restore the balance of the bridges represented by inductances 58, 59, 60 and 61. Gear train 64 also is shaft-connected to drive gain control 42 or 30 to affect the gain of a signal from amplifier 41 or 29. In this connection it should be noted that the output of any pressure sensitive altimeter may be suitably connected to control the position of a potentiometer such as gain control 42 to produce the same result as required here.

In the event the aircraft is designed for operation at speeds in excess of the speed of sound, a different gain control must be utilized, because the responsiveness of the airplane to deflection of the control surface is known to be dependent upon Mach number to an increasing degree for higher Mach numbers. In that event, the device shown in Fig. 9 may be utilized in place of the device shown in Fig. 7. In Fig. 9, resistors 65, 66, 67, and 68 are connected in bridge fashion as shown, resistors 65, 66, and 68 being variable resistors as shown. Variable resistor 65 is driven mechanically according to the static pressure in a manner similar to that shown in Fig. 7. The wiper of resistor 68 is driven in a similar manner by an amount proportional to the difference between static and ram air pressure after a fashion well known in the Mach number indicator art. Unbalance of the bridge resultant from displacement of these potentiometers, or variable resistors, causes a signal to be fed to amplifier 69 which in turn drives motor 70 mechanically connected to the wiper of variable resistor 66. Displacement of the wiper on this potentiometer restores balance to the bridge, reduces the output signal to zero, and the motion of the motor ceases. Meanwhile, the mechanical output of motor 70 also drives the wiper of potentiometer 71 which then constitutes a gain control when suitably connected in place of gain controls 30 or 42 in Fig. 2, with the output thereof fed to the elevator alleviation surface servo or the flap alleviation surface servo, the input being from amplifier 29 or amplifier 41.

Figure 5:
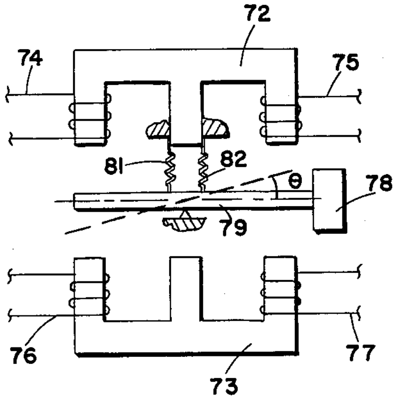
Fig. 5 is a schematic of the acceleration detecting device of this invention.
Figure 6:
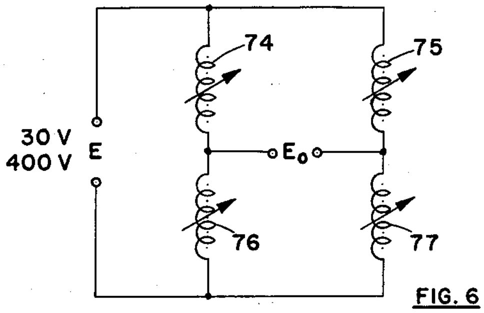
Fig. 6 is an equivalent circuit diagram of the device shown in Fig. 5.
Figure 11:
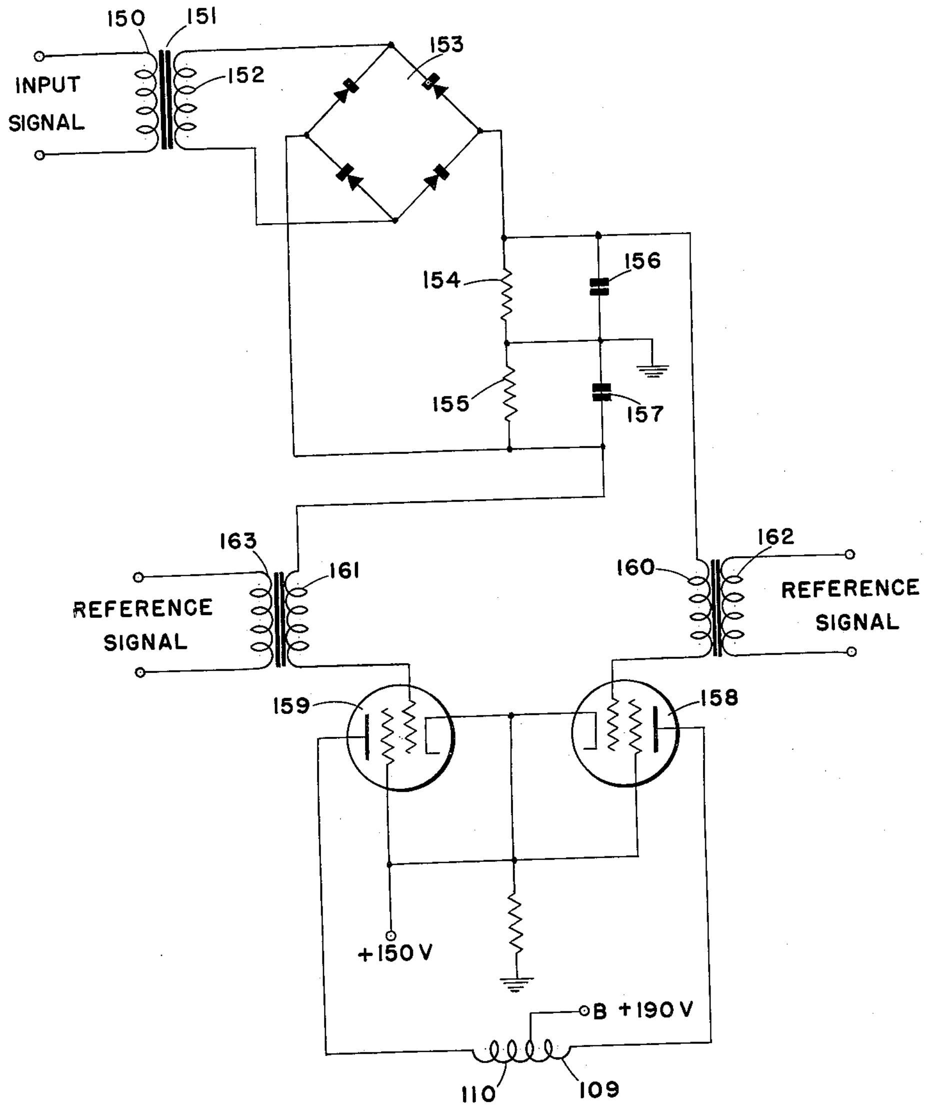
Fig. 11 is a circuit diagram of a servo amplifier of this invention.

The accelerometers contemplated for use in this invention are simple, spring-restrained, mass-type accelerometers as depicted schematically in Figs. 5 and 6. In Fig. 5, two E-shaped iron cores 71 and 73 carry windings 74, 75, 76, and 77 as shown, which windings are connected as indicated in Fig. 6 in bridge fashion. Mass 78 is supported by an iron vane 79 supported pivotally and of symmetrical construction. Springs 81 and 82 tend to keep the iron vane equidistant at both its ends from the ends of cores 72 and 73, with the acceleration of gravity alone acting upon the mass. Should an acceleration greater or less than gravity act upon mass 78, the iron vane is deflected and the inductance of windings 74, 75, 76, and 77 is unbalanced, with the result that the output of the bridge shown in Fig. 11 is a signal indicating the direction and magnitude of the acceleration to which the mass is subjected.

The device shown in Figs. 5 and 6 is typical of both accelerometers A and B. Since these accelerometers are not located at the center of gravity of the aircraft, the outputs are a function not only of the vertical acceleration to which the aircraft is subjected but also of the angular pitching acceleration thereof. When the accelerometers are located as shown in Fig. 1, the output of of accelerometer A may be represented by $N_z+r_1\ddot{\theta}$, where $N_z$ is the vertical acceleration to which the aircraft is subjected, $r_1$ is the distance of accelerometer A from the center of gravity of the airplane, and $\ddot{\theta}$ is the angular pitching acceleration of the airplane. Similarly, the output of accelerometer B may be represented as $N_z-r_2\ddot{\theta}$, where $r_2$ is the distance from the center of gravity to accelerometer B. It is apparent from inspection of the above equations that the angular pitching acceleration of the airplane may be readily computed by combining the above equations in such a manner as to eliminate the two $N_z$ terms. Similarly, the vertical acceleration to which the aircraft is subjected may be computed by combining the two above equations in a manner to eliminate the terms $r_1\ddot{\theta}$ and $r_2\ddot{\theta}$. If $r_1$ and $r_2$ are equal, these manipulations may be accomplished by simple addition and subtraction of the two equations. If the two distances are not equal, the proper factor must be utilized on one of the equations to effect the necessary equality of coefficients for $\ddot{\theta}$.

Figure 8:
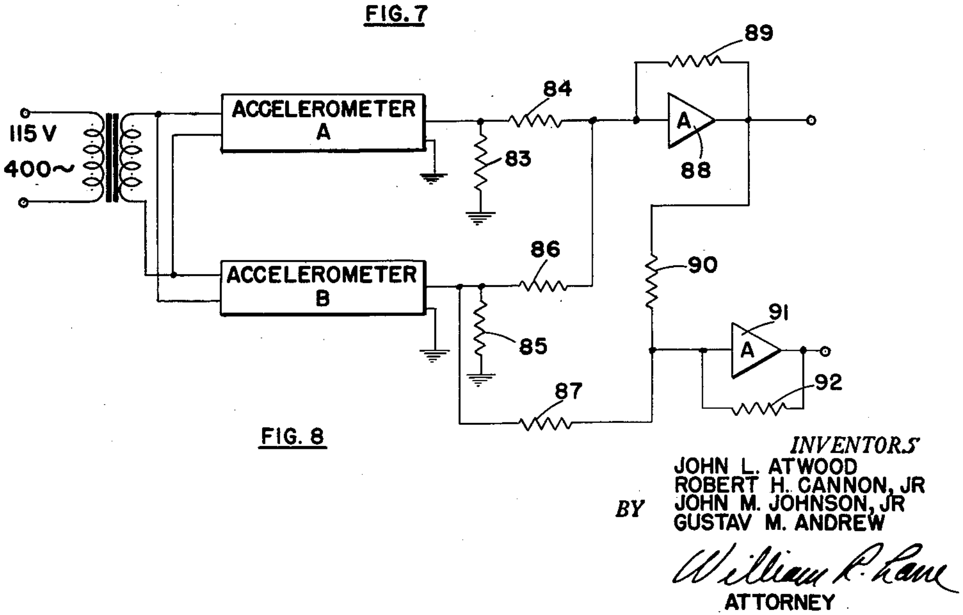
Fig. 8 is a circuit diagram of the acceleration computer of this invention.

The circuitry shown in Fig. 8 is designed to accomplish these simple computations. In Figure. 8, the ouput of accelerometer A is connected to resistors 83 and 84 as shown, while accelerometer B is connected to resistors 85 and 86. The output of accelerometer B is also connected to resistor 87 as shown. After passing through resistors 84 and 86 the signal outputs of accelerometers A and B, respectively, are added in amplifier 88 which in turn has an output proportional through $\ddot{\theta}$. A portion of this output is fed back to resistor 89 to the input of amplifier 88 for stability purposes, and the remainder is fed through resistor 90 to combine with the output of accelerometer B transmitted by resistor 87 to high gain amplifier 91. The output of this amplifier is proportional to $N_z$, the vertical acceleration to which the airplane is subjected. A portion of this signal is fed back to the input of amplifier 91 through resistor 92 for stability purposes. The outputs of amplifiers 88 and 91 are therefore signals proportional to the angular pitching acceleration to which the airplane is subjected, and the vertical acceleration to which the airplane is subjected, respectively. These signals are fed, as shown in Fig. 2, to amplifiers 41 and 29, respectively. The amplitude of these signals is adjusted by gain controls 30 and 42 as shown in Fig. 2, responsive to gain control servos 31 and 43 of the type shown in Fig. 9, as previously discussed. These signals then represent the corrected desired deflection of the alleviation surfaces.

Figure 4:
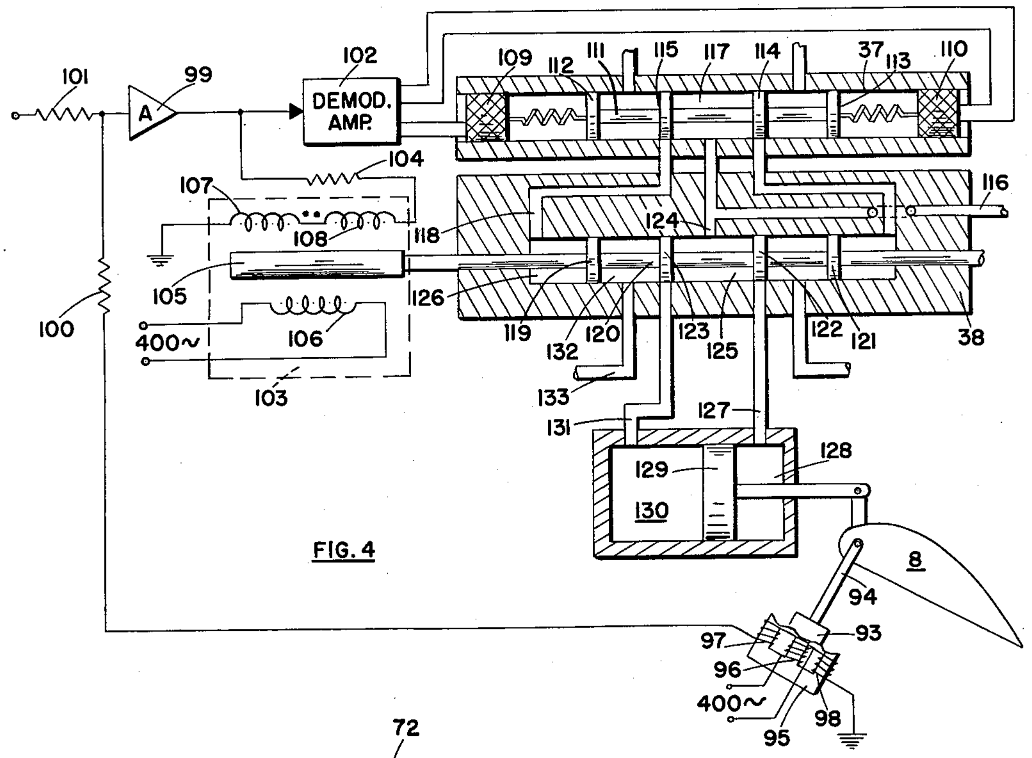
Fig. 4 is a detailed schematic of the hydraulic servo utilized in this invention.

To assure that the alleviation surfaces do deflect the desired amount, the servo shown in Fig. 4 has been provided. This servo is typical of servos 32 and 46 utilized to control the position of the flap and elevator alleviation surfaces, respectively, with respect to the flaps and elevators themselves. It should be noted that the pilot, by conventional means provided in the original airplane, controls the position of the flaps and elevators in a conventional manner by movement of the control stick or wheel, or other controls, to affect the general flight attitude of the airplane. The function of the alleviation system is to eliminate the up and down and rotational motions of the airplane, causing discomfort for the passengers. Thus, it is clear that the various alleviation surfaces must be deflected by an amount dependent upon the signal outputs of the various accelerometers and rate gyro as defined by the desired flap and elevator position signals fed to the flap alleviation servo and the elevator alleviation servo.

Referring, then, to Fig. 2, the signal representing the desired surface deflection is combined with a signal from pickoff 45 or 34*a* representing the actual position of the particular alleviation surface involved. Any of a number of suitable pickoffs may be employed.

The arrangement shown in Fig. 4 for indicating this actual position, consists of an iron armature 93 which is attached by arm 94 to one of the alleviation control surfaces such as alleviation control surface 8 shown schematically in Fig. 4. Rotation of the control surface about its pivot point causes movement of armature 93 relative to E-type pickoff 95 having primary winding 96 and secondary windings 97 and 98 oppositely wound on the extreme legs of core 95. Four-hundred cycle alternating current is supplied to primary winding 96. If armature 93 is exactly centered between the opposite legs of core 95, coupling of the 400-cycle signal to windings 97 and 98 is equal, and since the windings are wound in phase opposition, no appreciable output is received from the pair of windings. However, if the control surface is slightly deflected from this neutral position, coupling to one leg of the transformer is slightly greater than to the other due to the inductance of the iron armature, and a signal of magnitude proportional to the deflection of the alleviation control surface is generated. Since the windings are opposed as to direction of winding about the cores, the phase of the output signal for one direction of deflection of the surface will be 180 degrees out-of-phase with the signal generated when the surface is deflected in the other direction. Accordingly, a signal is supplied to amplifier 99 through resistor 100 which is proportional in magnitude to the actual surface deflection and is of phase indicative of the direction of deflection of the surface. Likewise, the desired control surface deflection from one of gain controls 30, 42, or 44 is introduced through resistor 101. These two signals are similar in that each is of magnitude proportional to the desired or actual deflection, and of phase corresponding to the desired or actual direction of deflection. A combined signal is amplified by amplifier 99 and fed to demodulator amplifier 102 in combination with a signal from linear differential transformer 103 through resistor 104. From Fig. 4 it is apparent that linear differential transformer 103 operates in a similar manner to pickoff 34 in that an iron slug 105 is varied in position in accordance with the position of slave valve 38. Slave valve 38 controls flow of hydraulic fluid to actuator 39 which in turn controls the position of the alleviation control surface. The position of iron slug 105 controls the coupling between primary winding 106 and secondary windings 107 and 108 wound in phase opposition. If a 400-cycle alternating current is supplied to primary winding 106, the output signal from secondary windings 107 and 108 will be a signal of magnitude and phase indicative of the magnitude and direction of the displacement of the slave valve. Therefore, fed to the input of demodulator amplifier 102 is a signal representing the difference between the required displacement of the valve and the actual displacement of the valve in order to achieve the surface deflection required.

This difference signal is an alternating current signal of amplitude and phase indicative of the magnitude and direction of the desired valve displacement. The output of demodulator amplifier 102 is a direct current signal of magnitude and polarity indicative of the magnitude and direction of the desired displacement of pilot valve 37 and is fed to solenoids 109 and 110 which exert axial force upon pilot valve stem 111. Detail of amplifier 102 is shown in Fig. 11 where the input signal is fed to primary winding 150 of transformer 151 whose secondary 152 is connected to bridge demodulator 153, the output of which is connected to a filter and voltage divider consisting of resistors 154 and 155 and capacitors 156 and 157. The smoothed D.-C. signal coming from this filter and voltage divider is fed to the control grid of power output tubes 158 and 159 through transformer secondaries 160 and 161, as shown. Transformer primary windings 162 and 163 receive a high frequency alternating current signal which is superimposed upon the direct current applied to the grids of tubes 158 and 159 to provide a dither or slight vibration of the pilot valve element to prevent sticking of the valve element. The plates of tubes 158 and 159 are connected to solenoids 109 and 110 as shown in Fig. 4, with B+ connected to the common connection between solenoids 109 and 110 as shown in Fig. 11.

Pilot valve stem 111 has end lobes 112 and 113 and central lobes 114 and 115. Flow of hydraulic fluid occurs through conduit 116 from hydraulic pump 13 or hydraulic pump 14. If the pilot valve stem is displaced to the left, fluid flows through chamber 117 and conduit 118 to end land 119 on slave valve stem 120. The slave valve stem also carries end land 121 and central lobes 122 and 123. Hydraulic fluid is supplied as shown through conduit 124 to chamber 125 of the slave valve so that fluid in this chamber exerts equal axial force in both directions upon the slave valve stem. If fluid flows through conduit 118 to chamber 126 of the slave valve due to displacement of pilot valve stem 111 to the left, slave valve stem 120 is displaced to the right, because a greater force is applied to end land 119 from the left than is applied from the right to end land 121. Accordingly, fluid flows from chamber 125 through conduit 127 to chamber 128 and actuator 39, forcing piston 129 to travel to the left and deflecting the alleviation control surface 8 upward. At the same time, fluid must flow from chamber 130 through conduit 131, chamber 132, and conduit 133, back to the pump or to a hydraulic reservoir.

Actuation of the pilot valve in the opposite direction produces exactly opposite actions of slave valve stem 120 and piston 129. As the alleviation control surface is moved, of course, the signal from pickoff 34 is reduced until it exactly balances the desired surface deflection signal coming through resistor 101, with the result that amplifier 99 receives no input signal and yields no output signal. The only input to demodulator amplifier 102 is then a slave valve error signal resulting from linear differential transformer 103, and this signal is driven to zero by motion of the pilot valve which in turn moves slave valve stem back to its neutral position.

Figure 10:
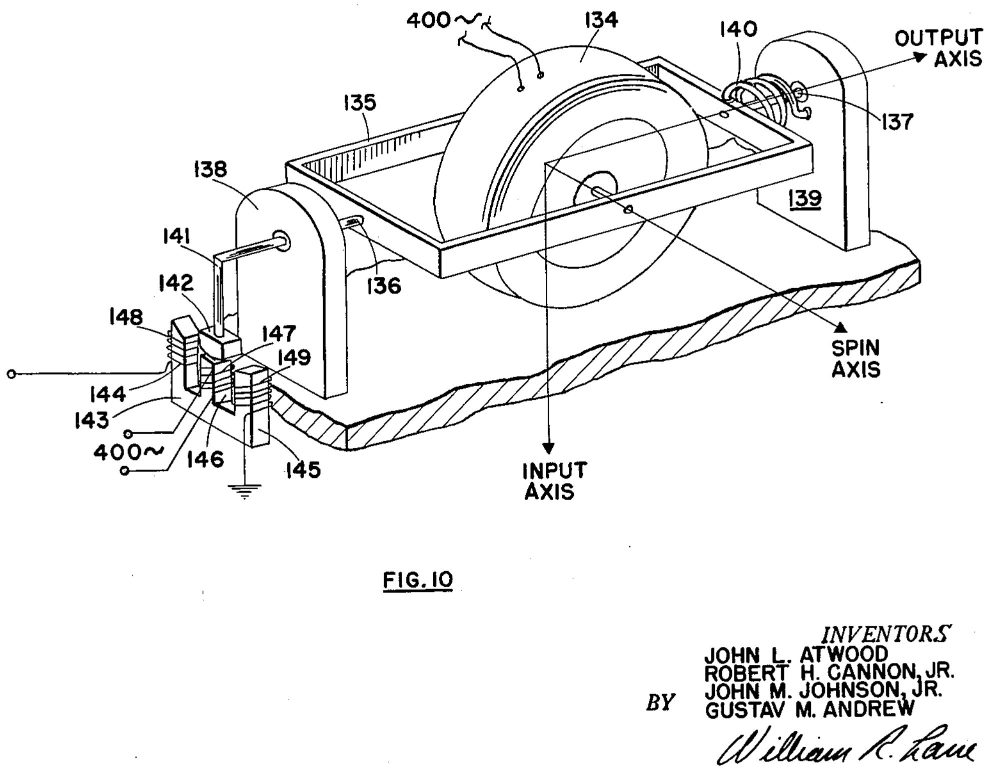
Fig. 10 is a perspective view of the rate gyro of this invention.

In Fig. 10, there is shown a rate gyro of this invention. The rate gyro consists physically of a motor-driven rotor in a casing 134 which is supported on frame 135 which in turn is supported on shafts 136 and 137 on gimbal mounts 138 and 139, as shown. Gimbal mounts 138 and 139 are supported upon the structure of the airplane in the manner required to orient the device so that the input axis of the gyro is the pitch axis of the airplane. Frame 135 is free to rotate with respect to gimbal mounts 138 and 139, and spiral spring 140 normally keeps frame 135 in a neutral position. Shaft 136 is connected to arm 141 which carries iron armature 142 adjacent to E-core 143. E-core 143 has outer arms 144 and 145 and central arm 146 upon which preliminary winding 147 carrying 400 cycle alternating current is wound. Arms 144 and 145 carry secondary windings 148 and 149 wound in phase opposition in the same manner as pickoff **34*a* so that if frame 135 rotates, a signal is generated by windings 148 and 149 of phase and amplitude proportional to the direction and magnitude, respectively, of the rotation of frame 135 about shaft 136. Four hundred cycle power, of course, is also supplied to a motor which drives with a rotor within casing 134. The signal output from windings 148 and 149 is fed to gain control 44 shown in Fig. 2. Action of the rate gyro may be described as follows. If the aircraft assumes a certain pitching velocity, the gyroscope tends to precess, causing rotation of frame 135 about shaft 136. This rotation is, of course, opposed by spring 140, but the magnitude and direction of the precession is indicated by the signal output from windings 148 and 149 at the pickoff associated with the rate gyro. The fixed element of the pickoff, namely, the E-core, is, of course, fixed with respect to gimbal supports 138 and 139**.

Returning now to the system as a whole, as indicated in Fig. 2, it must be understood that the 400 cycle power required by the various elements of the invention must come from a common source so that all pickoff signals are mutually in or out of phase. Action of the device is as follows. When the aircraft encounters a gust, it experiences, in general, a normal acceleration, a pitching acceleration, and a pitch angular velocity. The angular velocity is detected by pitch rate gyro 1. The pitching and normal accelerations are sensed by accelerometers A and B and combined by acceleration computer 28, shown in detail in Fig. 8, to yield signals of phase and amplitude indicative of the direction and magnitude of the normal and pitching accelerations. These signals are fed, as shown in Fig. 2, through flap servo 32 and elevator servo 46, as shown, as signals calling for a desired flap and elevator alleviation surface deflection. The magnitudes of these signals are, of course, modified by action of gain control servos 31, 43, and 44. The corrected signals are fed to flap alleviation surface servo 32 and elevator alleviation surface servo 46 which function in the manner well known in the servo art to achieve the desired alleviation surface deflection in each case. Since the action of the servos is dependent only upon the actual sensed acceleration and rate of the airplane, the servos themselves may be constructed to be of extremely high gain and fast operation. The flap alleviation surface and the elevator alleviation surface are then deflected by the action of the servos the required amount to eliminate the outputs of the rate gyro and the accelerometers. If the outputs of these instruments are zero, the aircraft is not being accelerated normally or angularly and is not translating up and down or rotating about its pitch axis, and hence the effect of the gust upon the occupants of the aircraft is eliminated. The outstanding advantage of the system as thus presented is that the actual effect of the gust is corrected; that is, the normal and pitch accelerations are sensed accurately and the alleviation control surfaces are moved to eliminate these sensed effects. With previously known systems, the accelerations and angular velocities had to be predicted by the use of an aerodynamic sensor in advance of the aircraft, and appropriate action has been taken to eliminate the predicted effect upon the airplane. Unfortunately, the effect of aerodynamic disturbances or gusts in producing accelerations of the aircraft, it has been found, cannot be satisfactorily predicted in this manner, and actual measurement of the accelerations and pitching motion of the aircraft provides a much more reliable indicator of the action required to eliminate the accelerations and pitching motion. By the use of high gain amplifiers throughout the system, fast action to correct the deviation from the steady state condition of the airplane can be initiated and continued throughout the disturbance. In addition, the secondary effects, such as the change in down-wash induced by deflection of the flap alleviation surfaces upon the elevators and elevator alleviation surfaces, effect of Mach number, altitude, aeroelastic effects, etc., need not be predicted but can be sensed directly and corrected as required. Finally, by the use of variable gain controls responsive to static pressure or Mach number, as shown in the various parts of the circuitry, the operation of the aircraft at various speeds and altitudes can be undertaken with uniform control surface reaction.

Tie-in of the gust alleviation control system of this invention with the conventional pilot's control system has been illustrated assuming that the aircraft is equipped with a system of direct controls wherein a movement of the pilot's controls links directly with the movement of the conventional control surface, such as ailerons, flaps, elevators, rudder, etc., and the gust alleviation system uses a separate set of control surfaces. The gust alleviation system disclosed herein is also applicable in connection with other types of control systems, such as those in which the pilot's stick and rudder motion are translated into an electrical signal or where the aircraft utilizes only a single set of control surfaces and the motion of the control surfaces is controlled directly by the motion of the pilot's control.

Figure 12:
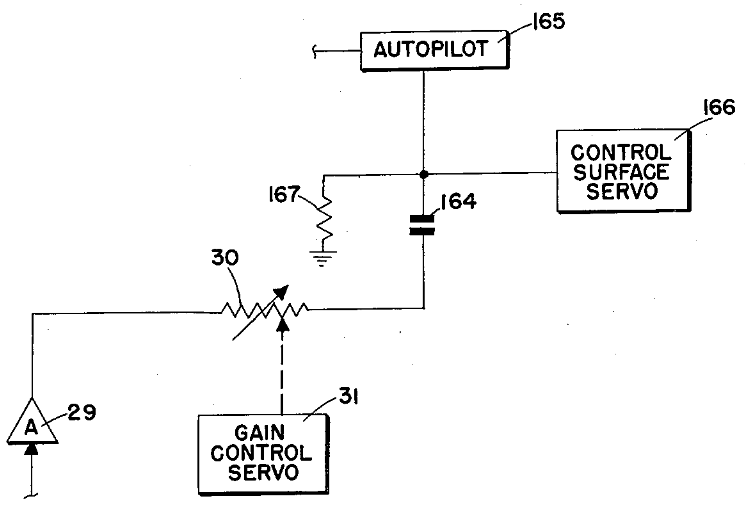
Fig. 12 is a schematic diagram of an alternative form of part of the tie-in arrangement of the invention.

To accomplish tie-in with these two systems, arrangements such as those shown in Figs. 12 and 13 are utilized. In Fig. 12, for example, at a point in the circuitry after gain control 30, shown in Fig. 2, the acceleration signal is passed through a condenser 164 and is then combined with a signal from autopilot 165 as an input to control surface servo 166. This function is to actuate the control surface in response not only to the autopilot but also to the gust alleviation system. To prevent long-time constant influence of the alleviation system from affecting the position of the control surfaces, a "washout" circuit, including capacitor 164 and resistor 167, is provided so that only relatively short term or high frequency signals are contributed by the gust alleviation control system and longer period steady control signals are supplied by the autopilot, which is in turn controlled by the pilot.

Another type of tie-in is illustrated in Fig. 13, wherein, for example, elevator servo 46 and slave valve 52 are controlled by the gust alleviation control system, as shown in Fig. 2; but this slave valve in Fig. 13 controls the position of the extensible link 168 instead of the hydraulic actuator, as shown in Fig. 2. Extensible link 168 is one element of the mechanical-hydraulic linkage between pilot's control 169 and the control surface 7. In other words, the pilot controls the airplane to fly in the direction and with the attitude he desires; but for the control of lift on any one of the surfaces to limit the effect of gusts, the extensible link 168 is varied in length to affect the motion of the control surface to compensate for short-time constant accelerations to the gust.

Other types of tie-ins to the control systems for airplanes may be readily apparent from the foregoing examples which are intended to cover typical existing types of airplane control configurations.

Although the invention has been described and illustrated in detail, it is to be clearly undersood that the same is by way of illustration and example only and is not to be taken by way of limitation, the spirit and scope of this invention being limited only by the terms of the appended claims.

We claim:

1. In an aircraft, a pair of accelerometers measuring linear acceleration of said aircraft along a predetermined axis normal to a line joining said accelerometers and to the pitch axis of said aircraft, means measuring the angular rate of said aircraft about said pitch axis, and means responsive to said measured accelerations and angular rate to vary control surfaces controlling said aircraft in flight for reducing said measured accelerations and angular rate to zero, said latter means having a time response suitable to effectuate control prior to the occurrence of significant displacements resulting therefrom.

2. In an aircraft having control surfaces, gust alleviation means comprising accelerometers in said aircraft for producing electrical signals proportional to accelerations thereof in directions transverse to the direction of flight of said aircraft, amplifiers amplifying said electrical signals, means responsive to said amplified electrical signals for actuating said control surfaces to initiate corrective action prior to the occurrence of displacements resulting from said accelerations, means responsive to altitude of said aircraft for controlling the gain of said amplifiers, angular rate measuring means producing electrical signals proportional to angular rates of said aircraft and means for introducing portions of said signals predetermined to produce angular rate corrections effectively independent of the speed and altitude of said aircraft into said amplifiers.

3. The combination with an aircraft having mutually perpendicular X, Y, and Z axes, with the positive X axis looking forward out through the nose, of aerodynamic control surfaces, a gust alleviation servo system comprising means responsive to the angular acceleration and to the linear acceleration components along said Z axis of said aircraft for providing sensory signals within said servo system, and auxiliary control surfaces appended to but operable independently of said aerodynamic control surfaces in response to said servo system, and effective to produce a correcting action before substantial displacements can be produced by said accelerations.

4. A device as recited in claim 3 in which said auxiliary control surfaces comprise airfoils rotatably attached to the trailing edge of said aerodynamic control surfaces.

5. A device as recited in claim 3 in which said auxiliary control surfaces comprise airfoils fitted within the trailing edge portion of the contour of said aerodynamic surfaces and rotatably attached to said surfaces so as to produce aerodynamic forces on said aircraft in a direction substantially normal to its direction of flight.

6. In an aircraft, a stabilizing system comprising: two linear accelerometers oriented to measure accelerations in the same direction; means for summing the output of said accelerometers; means responsive to said summed output for reducing the linear acceleration of said aircraft in the direction measured by said linear accelerometers; means for measuring angular velocity about the pitching axis of said aircraft; means for determining the difference of the outputs between said accelerometers; and means responsive to said latter two means for reducing the angular velocity and acceleration of said aircraft.

7. In an aircraft having three mutually perpendicular axes of reference, including an X axis in the longitudinal plane of symmetry, a pitching or Y axis positive out the right wing, and a Z axis extending positively downward, all of said axes originating at the C.G. of said aircraft, gust alleviating means, comprising: gust alleviating surfaces providing pitch and elevation control for said aircraft; at least two linear accelerometers spaced on opposite sides of said C.G. along said X axis and oriented to measure acceleration components parallel to said Z axis; means for summing the outputs of said linear accelerometers to obtain a value representative of the linear acceleration of the C.G. of said aircraft parallel to said Z axis; means for utilizing said value to effect an instantaneous linear acceleration correction of said alleviating means; means for measuring the angular rate and acceleration value about at least one axis other than the X axis of said aircraft, means for utilizing said measured angular rate and acceleration values to control said alleviating surfaces in a direction to reduct said angular rate and acceleration values to zero, said means being effective to reduce said linear and angular values to zero before significant variations can occur in the heading and attitude of said aircraft.

References Cited in the file of this patent

UNITED STATES PATENTS

| | | |
|---|---|---|
| 1,885,578 | Boylsow | Nov. 1, 1932 |
| 2,387,795 | Isserstedt | Oct. 30, 1945 |
| 2,487,793 | Esval et al. | Nov. 15, 1949 |
| 2,488,286 | Glenny | Nov. 15, 1949 |
| 2,620,149 | Strother | Dec. 2, 1952 |
| 2,626,115 | Atwood et al. | Jan. 20, 1953 |
| 2,649,264 | Slater et al. | Aug. 18, 1953 |
| 2,672,334 | Chenery | Mar. 16, 1954 |
| 2,723,089 | Schuck | Nov. 8, 1955 |
| 2,770,429 | Schuck et al. | Nov. 13, 1956 |
| 2,808,999 | Chenery | Oct. 8, 1957 |
| 2,863,622 | Ciscel | Dec. 9, 1958 |
| 2,873,074 | Harris, et al. | Feb. 10, 1959 |